Jan. 10, 1928.

F. S. CROZIER 1,655,725

APPARATUS FOR MAKING CONCRETE LUMBER

Filed Jan. 2, 1926    5 Sheets-Sheet 1

INVENTOR
F. S. Crozier

Jan. 10, 1928.  1,655,725

F. S. CROZIER

APPARATUS FOR MAKING CONCRETE LUMBER

Filed Jan. 2, 1926  5 Sheets-Sheet 2

INVENTOR
F. S. Crozier

Jan. 10, 1928.
F. S. CROZIER
1,655,725
APPARATUS FOR MAKING CONCRETE LUMBER
Filed Jan. 2, 1926
5 Sheets-Sheet 3
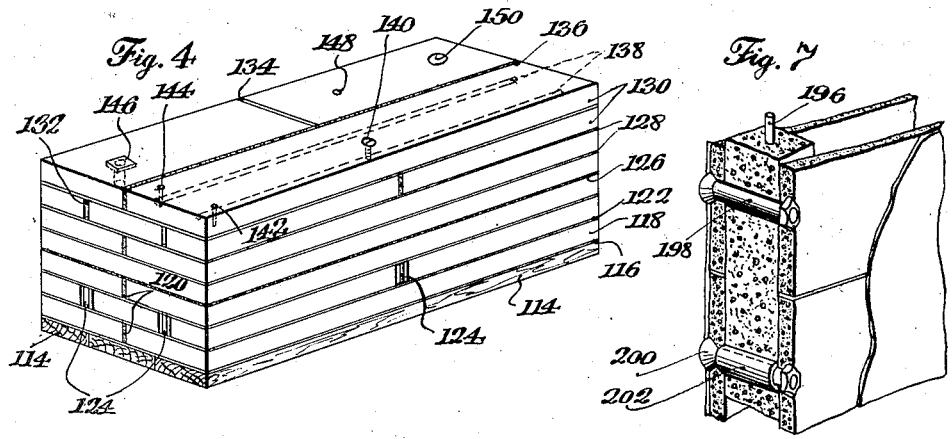
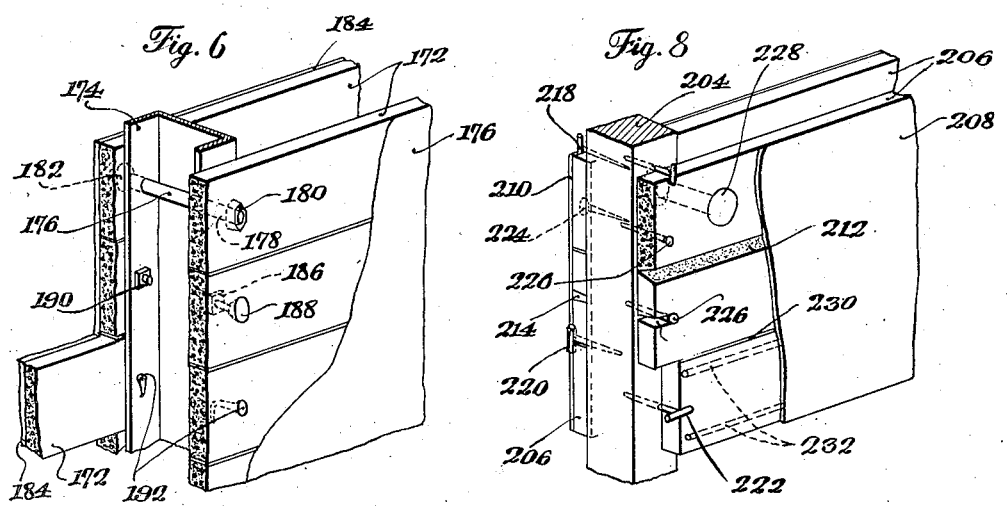
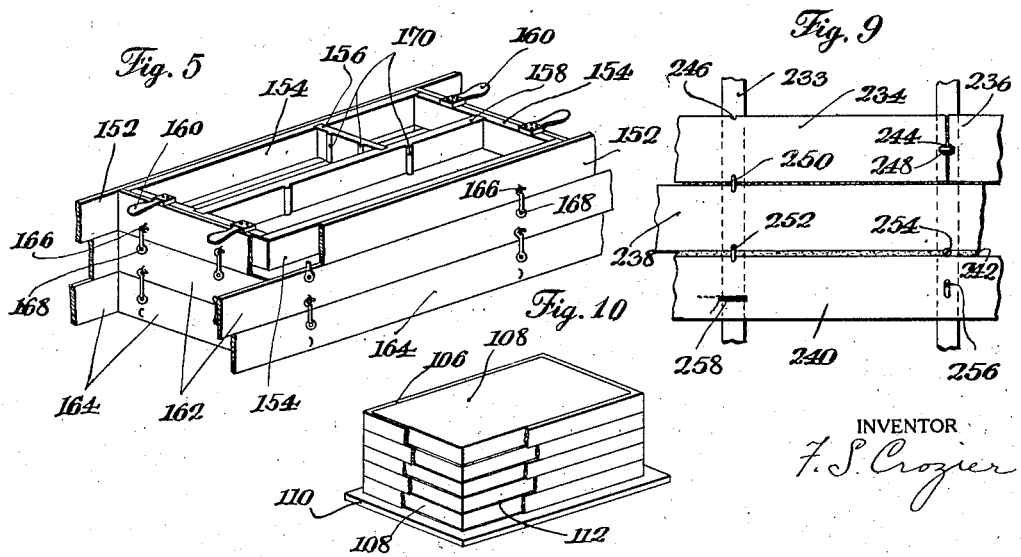
INVENTOR
F. S. Crozier Jan. 10, 1928.  1,655,725
F. S. CROZIER
APPARATUS FOR MAKING CONCRETE LUMBER
Filed Jan. 2, 1926   5 Sheets-Sheet 4
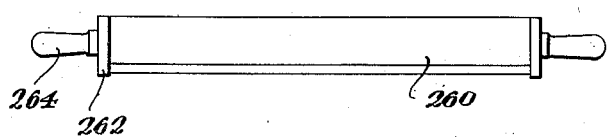
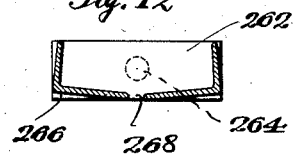
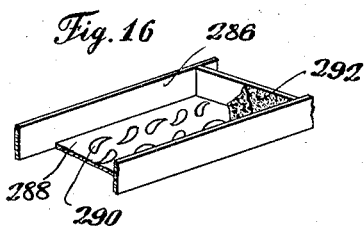
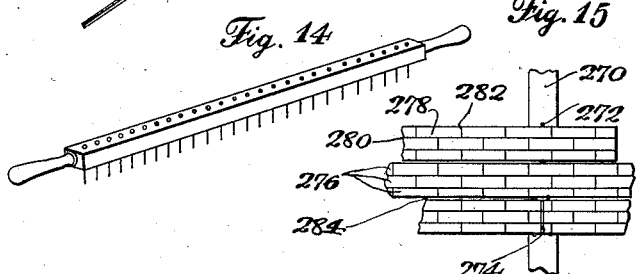
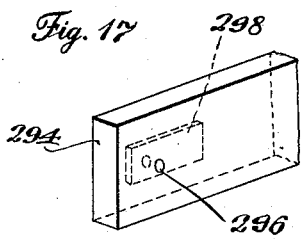
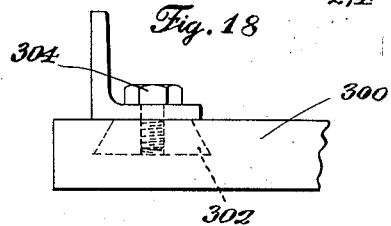
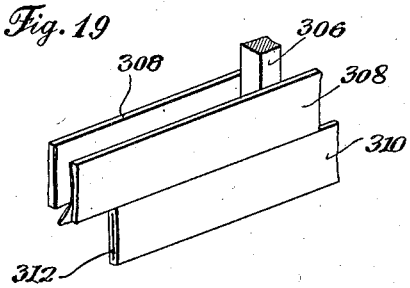
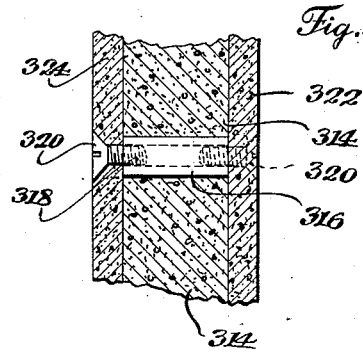
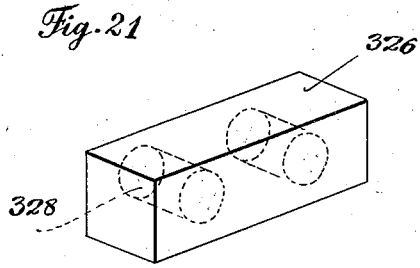
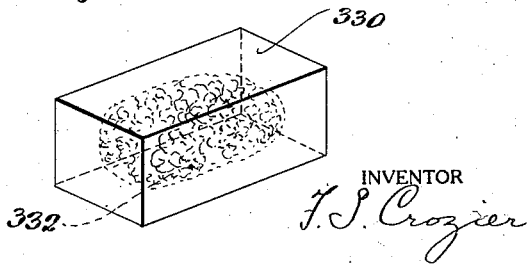
INVENTOR
F. S. Crozier Jan. 10, 1928.
F. S. CROZIER
1,655,725
APPARATUS FOR MAKING CONCRETE LUMBER
Filed Jan. 2, 1926   5 Sheets-Sheet 5
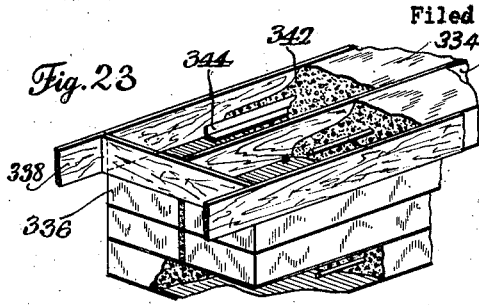
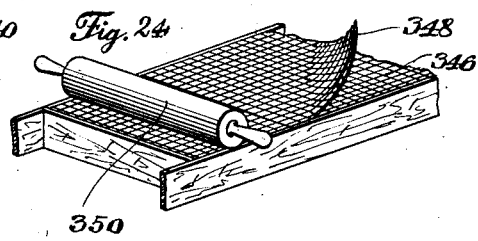
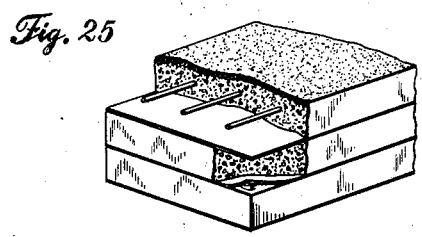
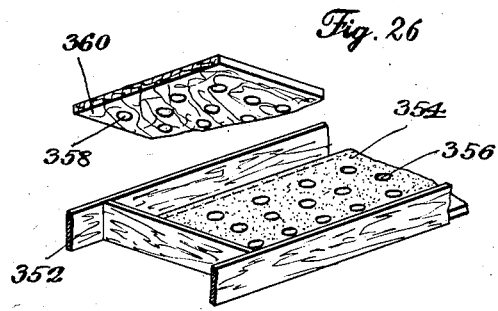
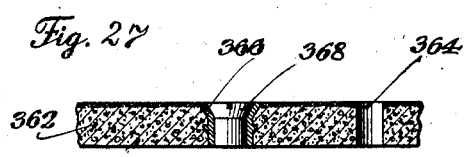
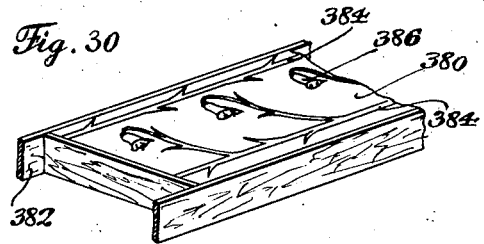
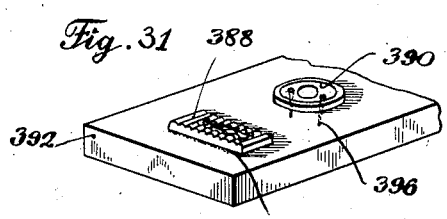
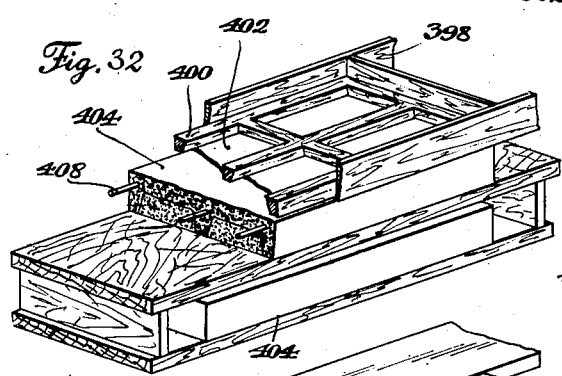
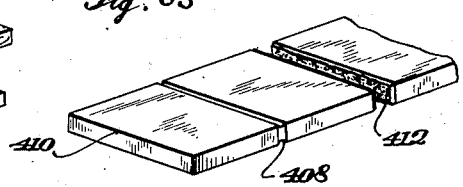
INVENTOR
F. S. Crozier Patented Jan. 10, 1928.

1,655,725

UNITED STATES PATENT OFFICE.

FLORENCE S. CROZIER, OF NEW YORK, N. Y.

APPARATUS FOR MAKING CONCRETE LUMBER.

Application filed January 2, 1926. Serial No. 78,983.

This invention relates particularly to the manufacture of lumber and timber units made of cement concrete or other cementitious mixture, for example boards, studding, joist, rafters, fence-posts, timbers etc., and other cementitious units or articles, and its chief object is to provide an apparatus which will enable the manufacture of such artificial stone products and cementitious units and articles of high quality rapidly and economically, and ready for convenient use.

The object of the invention is to make it mechanically, industrially and commercially practical to substitute concrete boards and other lumber and timber units for wooden boards and other lumber units very generally in building homes and other structures and for other uses, this in part by providing improved practical methods and apparatus and machinery that will enable the rapid and cheap production of ready-to-use and ready-cut concrete boards and other lumber units of more or less standard sizes and shapes corresponding with ordinary wooden lumber units, made largely of local cheap inexhaustible materials such as waste cinders and ashes and slag, sand, crushed stone, etc., used with the cement to make the concrete of which the lumber units are formed. As the concrete lumber usually will be made in the locality where it is to be used, in a local plant or otherwise, but preferably without a plant or factory but at the job where the building is to be erected, which this invention enables, the great cost and delays incident to lumbering, sawmill operation, shipment long distances by rail or water, handling and rehandling, hauling and re-hauling, weather deterioration, fire losses, insurance, finishing etc. experienced in the production and distribution of wooden lumber will be largely avoided or escaped by those producing fire proof concrete lumber.

There is now no scientifically ideal base on which to spread stucco, in use. Expanded metal, wood lath, wire mesh, burned brick and tile are all defective. Metal rusts. Stucco does not bond well on those surfaces. The expansion and contraction of the stucco and the base is different, often causing cracks. Concrete stucco put on my concrete sheathing boards bonds perfectly and both expand and contract together. They become one great monolithic sheet, a fire proof over- coat on a frame house. It is ideal, concrete on concrete. It makes the frame house fire proof without increasing its cost, gives all of the benefits of expensive masonry homes at the low cost of frame homes.

Another object is to produce concrete lumber units having special means for facilitating fastening the lumber units to or in a wall or structure, a very desirable thing especially when non-nailable concrete is used. It is less needed when the unit is made of nailable concrete, for example, concrete in which coal cinders, slag, volcanic ash or coke is used as the aggregate with the Portland cement. Another object is to produce concrete boards and other units having special surfaces for improving the bond of stucco and plaster thereto or for ornamentation and architectural appearance or for resisting the elements, to the end that better and more beautiful buildings will be possible and the cost of repairs, painting, insurance, etc., be reduced. To these and other ends the invention consists in the novel features hereinafter described for making the units and articles and the apparatus or machine used for that purpose.

This application is for the apparatus or machine which I use for making the nailable concrete lumber and other products described in my co-pending application, Serial Number 608,604, filed December 23, 1923.

Concrete lumber units and other articles must, depending on the quantity of cement used and the prevailing climate, usually remain undisturbed one to four weeks until the concrete has set and hardened before the units or articles can safely be handled or used, so if a large output per day was manufactured it would take an exceedingly large area of land to spread the units out on which they harden unless they are made one above the other from the ground or other support up and left in the pile undisturbed until set and hardened; and available land is scarce and costly in or near cities and on lots where houses are to be built. Therefore the best, if not the only commercially practical way, is to make at least the concrete lumber units in vertical piles, preferably of a plurality of supported subdivided horizontal layers of plastic concrete one above the other separated by paper, sand, fabric, wooden or concrete boards, sheet-metal or other means for keeping the layers from touching each other, such means preferably being treated with asphalt, wax, oil, tar or other thing to make such means less likely to adhere to the concrete.

Referring to the drawings, Figure 1 is a side view of the preferred type of my improved apparatus or machine, used to make the concrete lumber units and other articles. Figure 2 is a top view and Figure 3 is an end view of the same apparatus or machine shown in Figure 1.

Figs. 4, 10, 23, 25 and 32 illustrate piles of lumber made by my method.

Fig. 5 shows some auxiliary apparatus for making piles of lumber such for instance as shown in Fig. 4.

Figs. 6, 7, 8, 9 and 15 show my lumber incorporated in various types of walls.

Figs. 11, 12 and 13 show devices for cutting the lumber into smaller sizes, Fig. 12 being a cross section on line 12—12 of Fig. 11.

Fig. 14 is a rake for roughening the surface of the lumber when desired.

Figs. 16, 24, 26, 30 and 31 show devices for forming ornamental designs in the surface of the lumber.

Figs. 17, 18, 19 and 20 show particular forms of reinforcement incorporated in my lumber.

Figs. 21 and 22 show devices for lessening the weight of the lumber units when desired.

Figs. 27, 28 and 29 show methods incorporating fastening devices in the lumber.

Fig. 33 shows the prefered method of cutting the concrete boards into smaller units after they are hardened.

Fig. 34 shows the method of making a large board from a plurality of smaller boards.

Figure 1:
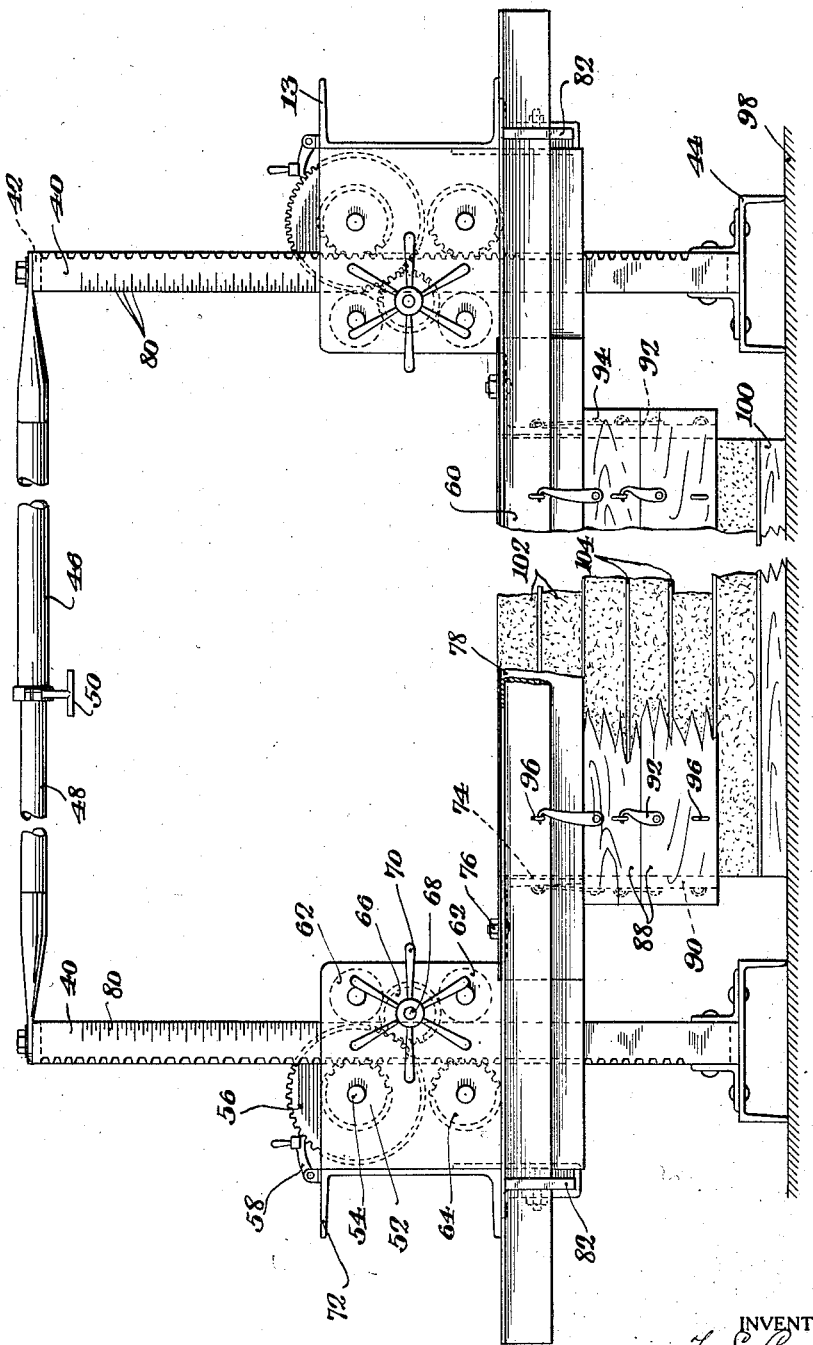
Figure 2:
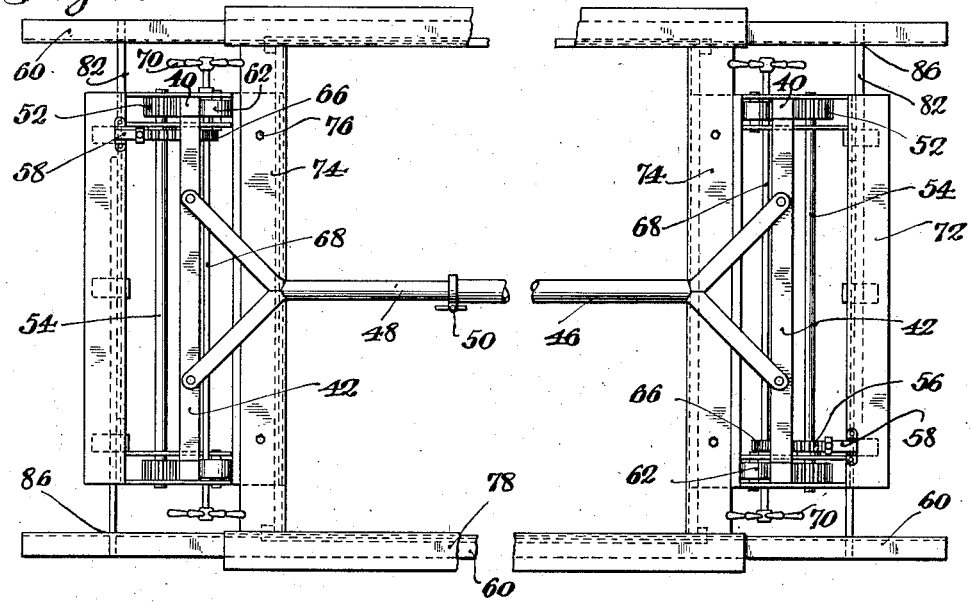
Figure 3:
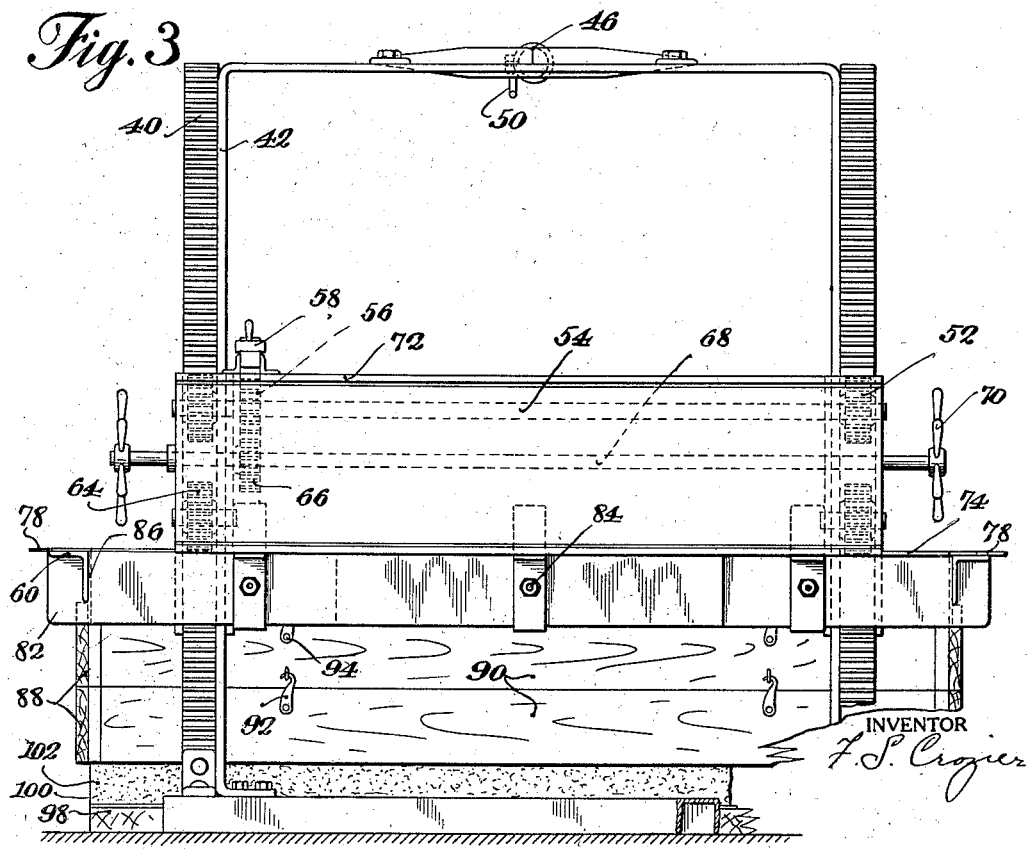

Examining more in detail Figures 1, 2 and 3, the numeral 40 designates each of the four vertical racks that are the corner-posts of the machine, 42 the frame bar to which racks 40 are attached and which ties the two racks at one end together and to the shoe or base 44 at the bottom. 46 and 48 are two spacing and bracing pipes, one telescoped inside the other for adjusting purposes and held tight by set-screw 50, these tying the tops of the two end frame bars together to help keep racks 40 vertical. A brace (not shown) extending from top of each end bar on a slant to the ground preferably is also used. Pinion 52 is rigidly keyed to shaft 54, the pinion meshing with the teeth on rack 40, another pinion 52 being keyed to shaft 54 near its other end to mesh with the other rack of the pair of racks at one end of machine. Another shaft 54 and pinions 52 connect and operate on the two racks 40 at the other end of the machine. Each shaft 54 is provided with a spur driving gear 56 rigidly keyed to the shaft, stop dog 58 operating in the teeth on the circumference of gear 56 to lock the mechanism and hold it at any desired point in its vertical travel or after the container has been raised. Two idler rolls 62 operate on the back side of rack 40 to help keep rack 40 vertical and its teeth meshing with pinion 52 and idler pinion 64. Drive pinion 66 is rigidly keyed to drive shaft 68 on each end of which shaft is rigidly keyed a hand-wheel 70, the said pinion meshing with the teeth of spur gear 56 on shaft 54.

Bearings for shafts 54 and 68 are furnished by the two housing boxes that enclose the pinions and rollers, which boxes are tied together by channel 72 to which they are rigidly fastened, making a self-sustaining mechanical structure having free and accurate vertical movement and to which is attached vertical end wall 74 of the container and an apron attached by bolts 76, and to which structure is removably attached the two vertical side walls 60 of the container and which preferably carry removable apron 78. Preferably on or near each corner-post is a vertical measuring scale 80 to quickly indicate the inches or fractions thereof that the container is raised or lowered, so both ends may be moved to the same extent each time by the two operators, one at one end and one at the other end of the machine.

At each end of the machine are two slide bars 82 side by side slidably resting just below channel 72 in housings suspended from channel 72, such housings being provided with set-screws 84 for cinching the slide bars at any desired adjustment point. Near an end of each slide bar is a vertical slot 86 extending down from its top part way, in which slot slidably rests the vertical web of the angle wall 60 which with its removable apron 78 comprise a vertical side wall of the container chamber of the machine. By moving the slide bars on either side of the machine out or in and providing removable end wall aprons of different desired lengths the chamber of the container can easily and quickly be adjusted to make concrete layers of any desired horizontal width; and by setting the two pairs of end posts closer together or farther apart, which would cause the sides 60 of the container to slide through slots 86 in slide bars 82 and the pipes 46 and 48 to lengthen or shorten as desired, it will be possible to make a concrete layer of any desired length in the container. This ready adjustability is of great practical and economic value in the art of making concrete lumber units, units necessarily of various standard widths, lengths and thicknesses.

Turning hand wheel 70 rotates shaft 68 and its pinion 66 which turns spur gear 56 to rotate shaft 54 and its two pinions 52 in unison, and as said pinions respectively mesh with the teeth on its rack, when said pinions are so turned the structure at that end of the machine must move vertically evenly, up or down as the case may be on the two end racks, carrying with it one end of the container and its burden. Another man, preferably at same time, similarly operates the mechanism at the other end of the machine. However, when side member 60 is attached with but one bearing point at each end thereof, as slot 86, it is practicable to raise first one end of the container and then the other, to the moderate extent usually required, without undue strain.

In order that the sides and ends of the concrete layers in the pile of layers may be longer protected against lateral displacement of the unset concrete pending its stabilization or setting to make it self-sustaining without lateral support, I preferably provide one or more detachable or removable extensions 88 and 90 for the side and end vertical walls of the container, and which when raised help trowel the edges of the layers and can be left on pile while necessary. Preferably these extensions are attached to the container and carried by hooks 92 turnably anchored to the extension by bolt 94 or otherwise, the hook being hooked into staple or eyelet 96 on the container; the next extension, as the container is raised and the pile of layers increases in height, is similarly attached to the first extension. By suitably supporting or bracing these extensions to keep them in place, and unhooking them from the container, the latter can be raised independent of the extensions high enough to clear the pile, so the entire machine can be dragged sidewise and removed without disturbing the pile of unset concrete layers or units and the work of building another similar pile near the first pile can go on at once. This keeps the machine busy and enables rapid production in large quantity at low cost.

In Figure 1 the side of part of a pile of my concrete boards or other lumber units is shown in the making. 98 is the ground, 100 a support for the pile of concrete lumber, 102 the unset concrete boards or other units and 104 the paper or other means between the layers for keeping the layers from bonding together or touching each other until they are set. Layers of concrete and paper are added alternately one above the other until a pile of the desired height is secured, as may be readily understood by referring to Figs. 4, 5 and 10 in which the layers and forms may be seen independent of the apparatus above described.

Figure 10 is a crude form of my apparatus that I use in some cases for making certain concrete products by my method. Preferably it consists of a plurality of removable frames 106, one above the other and surrounding a pile of a plurality of plastic concrete layers or units 108, resting on support 110, the layers or units being separated from each other by paper or other means 112. As shown part of each frame is broken away to show the layers or products inside. Preferably each frame is openable and adjustable, by means not shown, and is preferably of same height as the vertical thickness of the concrete layer or article to be made therein.

Figure 4 is a pile of hardened concrete lumber units, mostly boards, made by my improved method, 114 being the base or support on which the pile was made and rests, and 116 a layer of sand or other suitable inert material on which the bottom concrete layer preferably is made; but, when desired, support 114 can be dispensed with and the pile rest on the ground or a floor. 118 is one of two hardened concrete boards, say one inch thick, comprising the bottom layer of the pile, which layer was sub-divided while plastic by cutting the layer in two and filling the "cut" or space between the edges of the two boards with dry sand or other inert material or means 120 that will keep such boards apart until hardened. Being made of cinder concrete or other concrete of a kind into or through which nails can be driven after the concrete is set and hardened, the board 118 is provided with no fastener holes or other special fastener means, and, used as a sheathing board, it can be nailed to the wooden studding of a frame house, or to the joist or rafters, the same as if it was a wooden board, the edges and ends of the boards comprising the concrete sheathing being preferably united together with concrete mortar or other cementitious mixture so as to form one large monolithic sheet to protect against fire and weather. 122 is a sheet of paper, felt, fabric, composition or other separating element, preferably waxed, oiled or treated with asphalt, tar or other means for making it water proof or less likely to adhere to the hardened concrete products, and the second plastic concrete layer is formed thereon after it is put above the first layer. 124 are partitions that sub-divide the second concrete layer of the pile into a plurality of concrete lumber units, the two lengthwise partitions, each of a vertical height of say one inch (the thickness of the layer), were inserted in place in the container with their lower edges on the paper or other layer-separating means preferably before the concrete was put into the container to form such subdivided concrete layer; the cross-subdividing partition 124 was inserted preferably after the concrete layer was formed and before it was much set or hardened by being pushed down into the concrete to subdivide the layer into still smaller units; all these partitions 124 were left in place in the subdivided plastic concrete layer until the concrete of the layer was set and hardened, and then they were removed and used over again. 126 is a specially thick layer of dry sand or substituted inert material between two plastic concrete layers, used to keep the layers apart and to facilitate by absorption and drainage the removal of excess water from the adjacent sloppy wet concrete layers and thereafter to return to the setting concrete its stored up moisture while the concrete is hardening. The fourth concrete layer of the pile is left full size and not subdivided. 128 are sheets of metal, preferably galvanized, or of some other thing suitable for keeping the concrete layers apart. 130 are the top two less sloppy wet concrete layers of the pile, each subdivided; and between said layers is a wooden board that keeps them apart. 132 is one of the two vertical spaces left between the subdivisions of the concrete layer when the subdividing partitions were withdrawn preferably before the stabilized concrete became much hardened, which spaces were left open and not filled with anything; and 134 is a similar open or unfilled "cut" or space between two units, while 136 is such a space filled with sand or substituted material. 138 are metal reinforcing elements impedded in and covered by the concrete of which the board or other unit was made. 140 is a fastener hole in the board made by imbedding in the concrete while plastic a screw or other threaded element that preferably is left in until the concrete is at least partly set and hardened and then removed to leave a fastener hole. 142 is a nail or rivet or the like, preferably with a "head", that is inserted in the plastic concrete and later was removed as was 140 to leave a fastener hole. 144 is a fastener hole that was made in the plastic concrete by inserting and withdrawing a nail, screw, rivet, bolt, punch or other hole-forming means and filling the hole with sand or substituted material or means for keeping the hole from closing or becoming distorted or filled with concrete. 146 is a nut or other threaded fastener element or means that is at least partly imbedded in a surface of a concrete board or other lumber unit or article while the concrete was not much if any set or hardened and left in permanently to aid or facilitate attaching the unit or article by threaded means to or in a wall or structure or to another unit or article. 148 is a fastener hole made by inserting a cylindrical metal element in the plastic concrete unit, that is to remain in the product permanently to metal-line the hole. 150 is a fastener hole for a bolt or other fastener element having a head that is to be at least partly countersunk in the concrete unit or article.

Figure 5 shows one of the improved methods I employ in making concrete units of certain kinds with my apparatus or machine. 152 is the container, 154 a removable frame support for partitions 156 and 158, and 160 are handles rigidly attached to the frame but not attached to the container. Frame 154 is positioned inside of container 152, the tops of frame, container and partitions preferably being even with each other. Partitions 156 and 158 are preferably rigidly and permanently attached to frame 154, the weight of frame 154 and partitions 156 and 158 being carried by container 152 on the top edge of which handles 160 rest, so that by raising container 152, frame 154 and partitions 156 and 158 are also raised, and can likewise be lowered. Preferably the vertical height of the partitions is same as the thickness of the concrete layer or article being made, their lower edges resting on the paper or other means on which the concrete layer is to be made by filling the spaces in the container between the partitions and frame with concrete. When the subdivided layer is completed container 152 is raised and with it frame 154 until partitions 156 and 158 are out of contact with the concrete of the layer; then frame 154 and its partitions 156 and 158 are lifted off from container 152 by handles 160. The cracks or open spaces left by removing frame 154 and partitions 156 and 158 are filled with dry sand or substituted means for preventing the concrete from sagging or filling such spaces. The concrete layer so supported and protected is then covered with paper or other means for supporting the next concrete layer to be built above the first and to prevent its contact with the layer just completed. Frame 154 and its partitions 156 and 158 are put back in the container 152 and lowered until partitions 156 and 158 touch the layer-separating paper or means, then the operation is repeated. The sand or substituted means filling the space left by removal of frame 154 is kept in place by the walls of container 152 and its extensions 162 and 164 which are held in place by hooks 166 and 168. The projections 170 on partitions 156 and 158 make notches or depressions in the edges and ends of the concrete boards or other units or articles for the accommodation of fasteners and for other purposes. By using a partition of suitable shape the edges of the concrete board or article can easily be given a pleated saw-tooth or other desired form.

Figure 6 is cross-section view of a wall built of my concrete sheathing boards 172 attached by metal fasteners to steel channel studding or uprights 174, stucco 175 being put on the outer concrete boards and plaster 3 on the inner concrete boards, the edges of the concrete boards preferably being cemented together with concrete or other cementitious mixture. Several kinds of fastener means for attaching the concrete boards to the steel studding, joist or rafters are shown. 176 is a bolt that extends through fastener hole 178 in each of the two opposite concrete boards, one in the outer and the other in the inner sheathing course, and through two holes punched or drilled through the two webs of channel 174. 180 is a threaded nut on bolt 176, preferably at least partly countersunk in hole 178, and 182 is the head of bolt 176 shown countersunk in board 172 and covered with plaster 184. 186, 188 and 190 show short fastener bolts that extend only through the concrete board and one web of steel channel 174, and their threaded nuts. There is no chance for moisture to follow these bolts through the wall and these fasteners are more adaptable for varying needs. 192 is still another fastener, that is cinched in place or held by clenching or bending one end as shown or otherwise. In some cases I use a wire fastener that is threaded through a hole or notch in the concrete unit or put between two units to help attach the unit to or in a structure or to another unit or article.

Figure 7 is largely the same as Figure 6 except that reinforced concrete studding 194 containing element 196 is used in place of steel channel. Bolt 198 goes through a pre-made hole in the concrete studding or other unit, and bolt 200 goes through metallic cylinder or pipe 202 that is imbedded in and forms a hole through the concrete stud or unit.

Figure 8 is a cross-section view of a wall for a frame building having wooden studding 204 to the two opposite sides of which is nailed, screwed or otherwise fastened a plurality of concrete boards 206 to form an inner and outer fire proof concrete sheathing to protect the structure and contents and the wooden frame-work or studs against fire, weather, insects, rats, heat and cold, to increase the strength and durability of the wall and when desired be an ideal base for stucco 208 and plaster coat 210; and with some variations as to details floors, ceilings, roofs and partitions can be made of these concrete boards entirely or in part largely in the same manner. In some cases I bevel the face, or the edges or ends of the concrete boards while plastic, say as at 212, to make it more certain that water will run outwardly or to better enable stucco or other cementing agent to get in between the boards edges or ends to cement them together, and for architectural appearance. In some cases I slot the end or edge of a board as at 214 for fasteners 216 so it will be easier to adjust board in wall. Fasteners 218, 220 and 222 can be used when the boards or units are made of concrete that is not nailable and no fastener holes have been made therein. 224 and 226 are ordinary wire nails, spikes or other driven fasteners or screws inserted in pre-made fastener holes in the concrete boards and then driven or screwed into the wooden studding, joist, rafter or other wooden unit. 228 is a bolt or other metal fastener that connects or ties the two concrete board sheathing walls together, preferably without going through and weakening the studding. 230 is a joint without mortar. 232 is metal reinforcing which sometimes it is wise to imbed in the concrete board or a thick concrete plank such as preferably comprise the lowest or bottom course of the concrete board sheathing and which may so largely carry the weight of the concrete boards above and must prevent any settling that might cause cracks in the sheathing or the stucco or plaster thereon and let moisture in. This precaution is advisable especially when the foundation on which the building rests is piers or posts, not solid masonry. Preferably the weight of the concrete board sheathing is on the foundation and not on the nails or fasteners, but it safely can be largely carried on the studding and other frame elements when steel or reenforced concrete studs or frame are used, through use of suitable attaching bolts or fasteners. I prefer to waterproof a face of my units after they are set.

Figure 9 is a face view of part of a wall made of vertical wooden studding 233 to which is attached a sheathing composed of a plurality of my improved concrete boards 234, 236, 238 and 240 united together with the aid of concrete or other cementitious mortar 242. Board 234 has a notch or depression (244 and 246) in each of its two edges and in its end, so fasteners can be used to help attach the board to the structure without having holes through the board and to enable the ends and edges of the boards to be in contact with each other, or to enable use of a thin mortar-joint. Fasteners 248 and 250 are in such notches and each has a "head" that preferably extends beyond the notch to clasp or cinch and better secure the board in place, or it may be at least partly counter-sunk in the notch. 252 and 254 are fasteners with "heads," to be driven, screwed or otherwise inserted between the edges or ends of two adjoining concrete boards or other units or articles that do not have fastener holes, notches or other fastener means in them, so as to secure such boards, units or articles to or in a wall or structure or to another unit or article, the "heads" preferably extending over and securely clasping or cinching the ends or edges of such boards, units or articles. In these cases the space between the two adjoining boards will be wider and mortar joint 242 thicker. 256 is a vertical slot and 258 a horizontal slot in board 240, allowing some adjustability for the fasteners that go in such slots.

Figures 11 and 12 show a slotted guide for a knife or other tool or means used to cut or subdivide a plastic concrete layer while in the container of my apparatus or machine into a plurality of boards or other units or articles and for other purposes, 260 being the angle-irons of which preferably the guide is made, 262 the ends which rigidly tie the angle-irons together, 264 the handles, 266 the slant of the bottoms of angle-irons set so only their front or slot edge will touch the concrete (to avoid "mussing up" or disfiguring the face of the concrete layer), and 268 is the slot that guides the knife, etc. Figure 13 is one kind of tool used with the device in Figs. 11 and 12. Figure 14 is a rake, preferably made (as shown) by driving a lot of nails through a wood strip, used to groove or roughen surface of my concrete boards or other units so stucco or plaster will more readily and securely bond thereto and for other purposes.

Figure 15 is a face view of part of a wall built of studding 270, to which is secured by fasteners 272 and 274 my concrete boards 276 and 278, the face of each board being grooved or otherwise marked (as by marks 280 and 282), so that when the boards are put together in a wall the wall will resemble or look like part of the face of a brick, tile, stone or other masonry wall, mortar 284 being preferably put between the edges of the boards or of tile floor or roof.

Figure 16 illustrates one of my improved methods of making boards and other concrete lumber units and articles having an ornamental face or a face ornamented, whereby the exterior of frame and other buildings, built preferably at least in part of my concrete lumber, may be ornamented and beautified in a great variety of ways at a relatively nominal cost, and the interior of buildings also; and the variety will be still further multiplied by using a different color or shade of color of concrete, or concrete made of any one or more of many different available aggregates, in making the concrete of which at least the ornamental face of the product is formed. 286 is the container in which the ornamental boards or units are made, and 288 is the pattern, metal sheet or other substance or fabric having on its face or in its weave an ornamental pattern or a design 290 stamped, carved, molded, pressed, sculptured or otherwise made thereon; and 292 is the concrete put in the container upon the face of such ornamental pattern or design to form the ornamented concrete units or articles. Ornamental stamped sheet metal so commonly used for ceilings, cornices, interior wall decorations, and picture frame moldings and many other highly ornamental and artistic things, having a face in relief or fashioned with classical or other designs or patterns are available at a relatively nominal cost for my use over and over for this purpose, thus transferring their ornamental designs or reproducing them with slight expense on the face of my inexpensive concrete stone boards that will endure forever uninjured by the ravages of time or the elements. They will not rust like iron will, nor require repainting or repair. Preferably I cover the upturned ornamental face of the pattern or design when it is laid in the container with the cementitious mixture of the desired character and color and of about the consistency of whipped-cream, working the same to remove the pocketed air bubbles therefrom and to fill with the mixture all of the nooks and parts of the ornamental design or pattern; and then I put on such facing enough concrete to fill the container and complete the concrete board or other lumber unit or article, and when desired I provide the product with fastener means by one of my several methods herein elsewhere described; the product being left on such pattern support until it is at least partly set and hardened.

Figure 17 is part of a concrete board or other lumber unit 294, having a fastener hole 296 that goes through both the unit and the metallic reinforcing element 298 that is imbedded in the unit, making a stronger fastener means. Figure 18 is a concrete board or other lumber unit or article 300, in a face of which is permanently imbedded or held a nut or other threaded metallic fastener element 302, 304 being a threaded bolt, screw or other thing that is put through the object or unit to which the board, unit or article is to be attached (as shown here, a web of a channel iron studding) and its threaded end screwed into said nut or other fastener element 302 that is imbedded or held in the concrete board, unit or article.

Figure 19 is part of a wall having a stud 306, to each side of which is secured concrete boards 308 and 310, boards 308 having on their inner surface permanently secured thereto asphalted, oiled or waxed paper or other means for keeping moisture, cold, heat or sound from at least so readily going through such boards, and 312 is a sheet of such paper or other means for the same purpose imbedded in concrete board 310.

Figure 20 is a cross-section of a wall having a reinforced concrete studding 314 containing a section of pipe or other round hollow element 316 threaded on its inner surface 318 and preferably extending through stud 314, fastener screws or threaded bolts 320 being inserted through fastener holes in concrete boards 322 and 324 and screwed into the threads on the inner surface of said pipe 316 to secure the boards to stud 314. Figure 21 is a board or other lumber unit 326, of some size and thickness made lighter by imbedding in the concrete thereof pasteboard hollow rolls or tubes or space-filling means 328. Figure 22 is a similar unit 330, made lighter by imbedding in the concrete of which it is made lumps of coke, cinders, or other light or lightening material or means 332.

Figure 23 shows a method of putting reinforcing rods or means into my reinforced concrete boards and other lumber units 334 and 336 while in container 338, that is divided by partition 340. The container is first partly filled with concrete 342 to form the lower part of the layer, on which the reinforcing elements 344 are laid in the desired positions, the balance of the container being then filled with concrete to imbed the reinforcing elements and complete the layer and boards or units, which are left to harden.

Figure 24 shows my method of ornamenting my concrete or other lumber units 346 by pressing into the plastic surface thereof while in the container a wire mesh 348 or other fabric, pattern, design or other means for ornamenting, with the aid of roller 350 or other pressing means, then stripping off or removing such mesh, fabric or other ornamenting means, preferably at once, suitably protecting the ornamented face against soil or disfigurement and let product set and harden. Figure 25 shows a pile of my concrete boards each having a special face that has been ornamented with a top layer of concrete of a different kind or color than the balance of the concrete of the board. Figure 26 shows how I make my ornamental boards or other lumber units by putting in container 352 a layer of moist sand 354 and pressing into the sand surface an ornamental design 356 made by pressing on the sand and then removing ornamental face 358 of pattern 360, then covering the impressed sand layer with soupy-wet concrete of the desired kind and color and on this put concrete that preferably is not so wet to fill the container and complete the unit.

Figure 27 is cross-section view showing one of my ways of making fastener holes through my concrete boards or other lumber units 362. Hole 364 is simply punched and left open. The other hole is permanently metal-lined, made by inserting cylindrical element 366 in which is metallic element 368 that preferably is not removed until after the concrete has at least partly set and hardened. Figure 28 is a cross-section of my concrete board or other lumber unit 362, in the concrete of which is permanently imbedded one end of a metallic fastener element 370 to facilitate attaching the unit in a wall or to another unit or article, the other hole, 372, being designed to accommodate and at least partly counter-sink the head or nut of a bolt or other fastener. Figure 29 is cross-section of one of my concrete boards or other lumber units 362, having a special waterproof facing 374 and two fastener holes, 376 and 378, just made in the unset plastic concrete, hole 376 being filled with dry sand or substituted material to keep it from being distorted before the concrete is set, then being removed, and the other hole, 378, is left filled by the rivet or other means used to punch the fastener hole through the plastic concrete, which means preferably is removed after the concrete unit has at least partly set and hardened leaving a fastener hole of the desired shape and size at the correct pre-determined spot.

Figure 30 shows another of my improved methods for making an ornamental concrete board or other lumber unit 380 in container 382 by carving, sculpturing or otherwise forming or fashioning a face thereof while plastic or at least not fully set or hardened, with the desired ornamental designs 384 and 386 or other ornamentation, in relief or otherwise, then protecting said ornamented face against blemish until hardened. Figure 31 shows how I attach applied ornaments 388 and 390 to my hardened concrete board or other lumber unit 392, 398 being cemented on with cementitious mortar 394 which makes a monolithic union, and 390 is attached by the aid of fasteners 396.

Figure 32 shows my preferred method of making concrete sidewalk, floor or roof boards or plates with my improved apparatus or machine. 398 is the container, 400 a wooden or metal pattern frame, 402 a wooden or other support for the plate that is to be made, a plate like 404. First the spaces within the frame are packed full to the top of the frame with moist sand, then frame 400 is removed and the spaces left by its removal filled with wet "mix" concrete. Enough additional concrete is then put in and leveled off to cover the first concrete and the sand but preferably not enough to fill the container 398, and on this concrete (when plate is to be reinforced) reinforcing element 408 is laid in proper position. Then sufficient additional concrete 404 is put in the container to fill it and cover and imbed the re-inforcing element and complete the plate. The top of the board or plate then is given any desired finish or marking and protected against blemish until hardened, then, freed of the sand, it can be marketed. Other shaped plates for walks, floors, roofs can also be made.

Figure 33 shows my preferred way of cutting my concrete boards and other lumber units after they have hardened. Groove 408 is made in unit 410 with a tool or emery or carborundum wheel, so the unit will break straight, as at 412. Some kinds of my concrete lumber units can be sawed if not too old or hard, or drilled to make fastener holes; but the best and cheapest way is to cut the units to final size and shape while the concrete is plastic or at least not much set. Figure 34 shows my preferred method of making a large concrete board or other lumber unit of two or more smaller boards as 414 and 416 or other concrete lumber units by joining them together monolithically by cement 418, preferably without the aid of metal fasteners.

While my improved method and invention permits the use of hand means, and other mechanical means than those shown in the drawings and these specifications for raising and lowering said container and for supporting same and holding it stationary in any desired position, for widening, deepening and lengthening the container (which preferably should be deep enough to cover and protect the edges of more than one horizontal concrete layer therein and be bottomless), for supporting and protecting the layers and their units and for keeping them apart, and for providing the product with fastener means, without departing from the spirit and purpose of my invention, I prefer the simple, quick, cheap and efficient rack and pinion and other means herein shown for those purposes as being more practical and economical than other means I have in mind; and for same reasons I prefer the method and means herein shown of making the products in a pile and of a plurality of separated, subdivided concrete layers one above the other, instead of more crude, slow, cumbersome and costly methods and means I have in mind. When sand or other granular material is used to keep the layers or the subdivisions of a layer apart, particles thereof remain partly imbedded in the concrete surface giving it a desirable roughness and texture.

Usually the concrete layers of which my concrete boards and other lumber units are made are so thin that the concrete, even when very wet, can be "worked" or manipulated when put into the container so as to quickly eliminate the excess water and densify or stabilize the concrete to make it self-sustaining even if practically unset and enable removal of all lateral support very soon, in fact almost immediately.

My invention is not limited to the specific procedure and apparatus herein described, but it can be practiced in other ways without departing from its spirit as described in the following claims, including, for making inferior grades of my products, use of cementitious mixtures other than concrete.

I claim:

1. In an apparatus for the manufacture of concrete lumber and other cementitious articles, in combination, a bottomless container for a concrete or other cementitious layer subdivided into a plurality of separated units, means for supporting the subdivided layer, means for keeping the units from touching each other, means for vertically moving the container without moving the layer or units.

2. In an apparatus for the manufacture of concrete lumber units or other cementitious articles, in combination, a bottomless container for a plurality of subdivided concrete or other cementitious layers, means for supporting the layers, means for keeping the layers from touching each other, means for keeping the subdivisions of a layer from contact with each other, means for vertically moving the container and means for holding the container stationary where desired.

3. In an apparatus for the manufacture of concrete lumber and other cementitious articles in a pile of horiozntal separated concrete or other cementitious layers one above the other, in combination, a horizontal container for a plurality of plastic concrete or other cementitious layers the vertical walls of the container being high enough to cover and confine (and when vertically moved trowel) the exterior edges of two or more of the layers, means for supporting the pile of layers, means for keeping the layers from touching each other means for subdividing the layers into units of the desired sizes and shapes when such subdividing is desired and means for preventing the units of a layer coming in contact with each other until set and hardened and means for successively raising the container to the desired extent to regulate the thickness of each layer as the pile of plastic layers is built up one layer at a time.

4. The apparatus described in claim 3 and means for lengthening downwardly to the extent desired as the building of the pile of plastic layers proceeds the vertical walls of the container by additions thereto that will enable the container and such extensions to confine and longer protect the exterior edges of more of the layers.

5. The apparatus described in claim 3 and means for lengthening horizontally to the desired extent the side and end walls (or the side or end walls) of the container to increase or decrease at will the horizontal dimensions of the space within the container whereby layers of any desired lengths and widths may be made in the container as well as layers of any desired thickness.

6. In an apparatus for the manufacture of concrete lumber units and other cementitious articles in combination, a container for forming one or more layers of concrete or other cementitious mixture, the width and length of the container horizontally being greater than its vertical height, the container being raisably attached to and supported by vertical posts or legs of the machine situated near the ends of the container, means operating on or in connection with such posts whereby the container may be successively raised to the extent desired, means connected with such means or such posts whereby the container will be held stationary after it is so raised, means not attached to the container for supporting the layer or layers.

7. In an apparatus for making concrete lumber units and other cementitious articles, in combination, a bottomless horizontal subdivided container for unset plastic concrete or other cementitious mixture, the permanent partitions that subdivide at least the uper part of the space within the container being of the same vertical height as the vertical thickness of the article to be made in the container, means not a part of the container for supporting the plurality of articles made by filling the subdivisions of the container with the cementitious mixture, means for raising the container and partitions to free the articles from the subdivided spaces within the container, means for holding the container and partitions stationary after they are raised and when a plurality of layers of such articles are made resting upon each other means for keeping the articles from touching each other until they are set and hardened.

8. In an apparatus for making cementitious lumber units or other articles, in combination, a vertically movable support for elements for confining a plurality of cementitious lumber units or other articles and means for vertically moving such support and the elements it supports, a frame or supporting means to which are rigidly attached one or more vertical walls or partitions for creating a plurality of mold chambers or spaces for a cementitious mixture, such frame and its walls or partitions being supported by and movable with (but preferably not unremovably attached to) said first mentioned vertically movable support, and when the mixture is not self-sustaining means for sustaining it after the vertical walls or partitions have been raised from contact therewith, and allowing the units or articles to set and harden.

In testimony whereof I affix my signature.

FLORENCE S. CROZIER.